US008554977B2

(12) United States Patent
Tseng

(10) Patent No.: US 8,554,977 B2
(45) Date of Patent: *Oct. 8, 2013

(54) INTEGRATED CIRCUITS FOR ACCESSING USB DEVICE

(71) Applicant: Via Technologies, Inc., New Taipei (TW)

(72) Inventor: Wen-Yu Tseng, New Taipei (TW)

(73) Assignee: Via Technologies, Inc., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/666,435

(22) Filed: Nov. 1, 2012

(65) Prior Publication Data

US 2013/0059453 A1 Mar. 7, 2013

Related U.S. Application Data

(63) Continuation of application No. 12/469,792, filed on May 21, 2009, now Pat. No. 8,347,017.

(30) Foreign Application Priority Data

Mar. 13, 2009 (TW) ............................... 98108207 A

(51) Int. Cl.
*G06F 13/00* (2006.01)

(52) U.S. Cl.
USPC ........................................... 710/313; 710/301

(58) Field of Classification Search
USPC .................... 710/100, 104, 301, 313; 439/78
See application file for complete search history.

(56) References Cited

U.S. PATENT DOCUMENTS

| | | | |
|---|---|---|---|
| 6,701,401 B1 | 3/2004 | Lu et al. |
| 7,021,971 B2 | 4/2006 | Chou et al. |
| 7,788,428 B2 | 8/2010 | Melin |
| 2008/0290486 A1 | 11/2008 | Chen et al. |
| 2010/0032818 A1 | 2/2010 | Pilling et al. |
| 2011/0001223 A1 | 1/2011 | Lee |
| 2012/0043651 A1 | 2/2012 | Lee |

FOREIGN PATENT DOCUMENTS

TW I278087 4/2007

OTHER PUBLICATIONS

Notice of Allowance mailed Oct. 29, 2012 in U.S. Appl. No. 12/469,792.

Universal Serial Bus 3.0 Specification, Revision 1.0; Hewlett-Packard Company, et al.; pp. 3-1~3-12 and 5-1~5-43; Nov. 12, 2008.

*Primary Examiner* — Glenn A Auve
(74) *Attorney, Agent, or Firm* — McClure, Qualey & Rodack, LLP

(57) ABSTRACT

An integrated circuit for accessing a universal serial bus (USB) device via a USB 3.0 receptacle is provided. The integrated circuit includes a plurality of pins and a controlling unit. The pins include a first group for coupling to a first pair of differential pins of the USB receptacle, a second group for coupling to a second pair of differential pins of the USB receptacle, a third group for coupling to a third pair of differential pins to the USB receptacle, a ground pin, a first and second power pins. The second group is disposed between the first and third groups. The controlling unit controls the plurality of pins to receive or transmit the USB 2.0 or USB 3.0 signals.

8 Claims, 14 Drawing Sheets

| | Standard-A | Standard-B |
|---|---|---|
| 1 | VBUS | VBUS |
| 2 | D- | D- |
| 3 | D+ | D+ |
| 4 | GND | GND |
| 5 | StdA_SSRX- | StdB_SSTX- |
| 6 | StdA_SSRX+ | StdB_SSTX+ |
| 7 | GND | GND |
| 8 | StdA_SSTX- | StdB_SSRX- |
| 9 | StdA_SSTX+ | StdB_SSRX+ |

FIG. 2A (PRIOR ART)

| | Micro-B | Micro-AB |
|---|---|---|
| 1 | VBUS | VBUS |
| 2 | D- | D- |
| 3 | D+ | D+ |
| 4 | ID | ID |
| 5 | GND | GND |
| 6 | MicB_SSTX- | MicA_SSTX- |
| 7 | MicB_SSTX+ | MicA_SSTX+ |
| 8 | GND | GND |
| 9 | MicB_SSRX- | MicA_SSRX- |
| 10 | MicB_SSRX+ | MicA_SSRX+ |

FIG. 2B (PRIOR ART)

INTEGRATED CIRCUITS FOR ACCESSING USB DEVICE

CROSS REFERENCE TO RELATED APPLICATIONS

This application is a Continuation of U.S. patent application Ser. No. 12/469,792, filed May 21, 2009, now U.S. Pat. No. 8,347,017, which claims priority of Taiwan Patent Application No. 098108207, filed on Mar. 13, 2009, the entirety of which are incorporated by reference herein.

BACKGROUND OF THE INVENTION

1. Field of the Invention

The invention relates to an integrated circuit (IC), and more particularly to an integrated circuit with a Universal Serial Bus (USB) 3.0 function.

2. Description of the Related Art

Universal Serial Bus (USB) is a serial bus standard for connecting an external apparatus, which has the capability to provide hot plug, plug and play and so on.

Currently, the USB 2.0 standard provides three transfer rates: low-speed; full-speed; and high-speed, which support 1.5 Mbps, 12 Mbps and 480 Mbps data rates, respectively. However, even faster transfer rates are being demanded for electronic apparatuses, due to increase in complex functions of the electronic apparatuses, so as to quickly access data from external apparatuses and subsequently perform related operations.

Therefore, the USB Implementers Forum established the next generation USB industry-standard, USB 3.0, to provide SuperSpeed data transfer and non-SuperSpeed (i.e. USB 2.0) data transfer simultaneously, wherein SuperSpeed data transfer supports a 5 Gbps data rate.

BRIEF SUMMARY OF THE INVENTION

Integrated circuits for accessing a universal serial bus (USB) device via a USB 3.0 receptacle are provided. An exemplary embodiment of an integrated circuit for accessing a universal serial bus (USB) device via a USB 3.0 receptacle is provided. The integrated circuit comprises a plurality of pins coupled to the USB 3.0 receptacle via a plurality of leads and a controlling unit. The plurality of pins comprises a first group coupling to a first pair of differential pins of the USB 3.0 receptacle, a second group coupling to a second pair of differential pins of the USB 3.0 receptacle a third group coupling to a third pair of differential pins of the USB 3.0 receptacle, a ground pin, a first power pin and a second power pin. The first pair of differential pins correspond to USB 2.0 signals of the USB device. The second pair of differential pins correspond to USB 3.0 signals of the USB device. The third pair of differential pins correspond to USB 3.0 signals of the USB device. The second group is disposed between the first group and the third group. The power pin is disposed between the second group and the third group. The first power pin is adjoined to the first group. The second power pin is adjoined to the third group. The controlling unit controls the plurality of pins to receive or transmit the USB 2.0 signals and the USB 3.0 signals.

Furthermore, an exemplary embodiment of an integrated circuit disposed in a specific package for accessing a universal serial bus (USB) device via a plurality of USB 3.0 receptacles is provided. The integrated circuit comprises a plurality of groups of pins, wherein each group of pins is disposed on different sides of the specific package and coupled to the corresponding USB 3.0 receptacle, and a plurality of controlling units. The pins of each group of pins are arranged in a single row along a side of the specific package where each group of pins is disposed on. Each group of pins comprises a first sub-group coupling to a first pair of differential pins of the one of the USB 3.0 receptacles corresponding to one of the USB devices, a second sub-group coupling to a second pair of differential pins of the one of the USB 3.0 receptacles corresponding to one of the USB devices, a third sub-group coupling to a third pair of pins of the one of the USB 3.0 receptacles corresponding to one of the USB devices, a ground pin, a first power pin and a second power pin. The second sub-group is disposed between the first sub-group and the third sub-group. The ground pin is disposed between the second sub-group and the third sub-group. The first power pin is adjoined to the first sub-group. The second power pin is adjoined to the third sub-group. Each controlling unit controls the corresponding group of pins to receive or transmit signals on the first, second or third pair of differential pins. The corresponding USB 3.0 receptacle is a Standard-A receptacle, a Standard-B receptacle, a Micro-AB receptacle or a Micro-B receptacle.

BRIEF DESCRIPTION OF DRAWINGS

The invention can be more fully understood by reading the subsequent detailed description and examples with references made to the accompanying drawings, wherein:

FIG. 2A shows a table illustrating pin assignments of the Standard-A and Standard-B receptacles;

FIG. 2B shows a table illustrating pin assignments of the Micro-B and Micro-AB receptacles;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
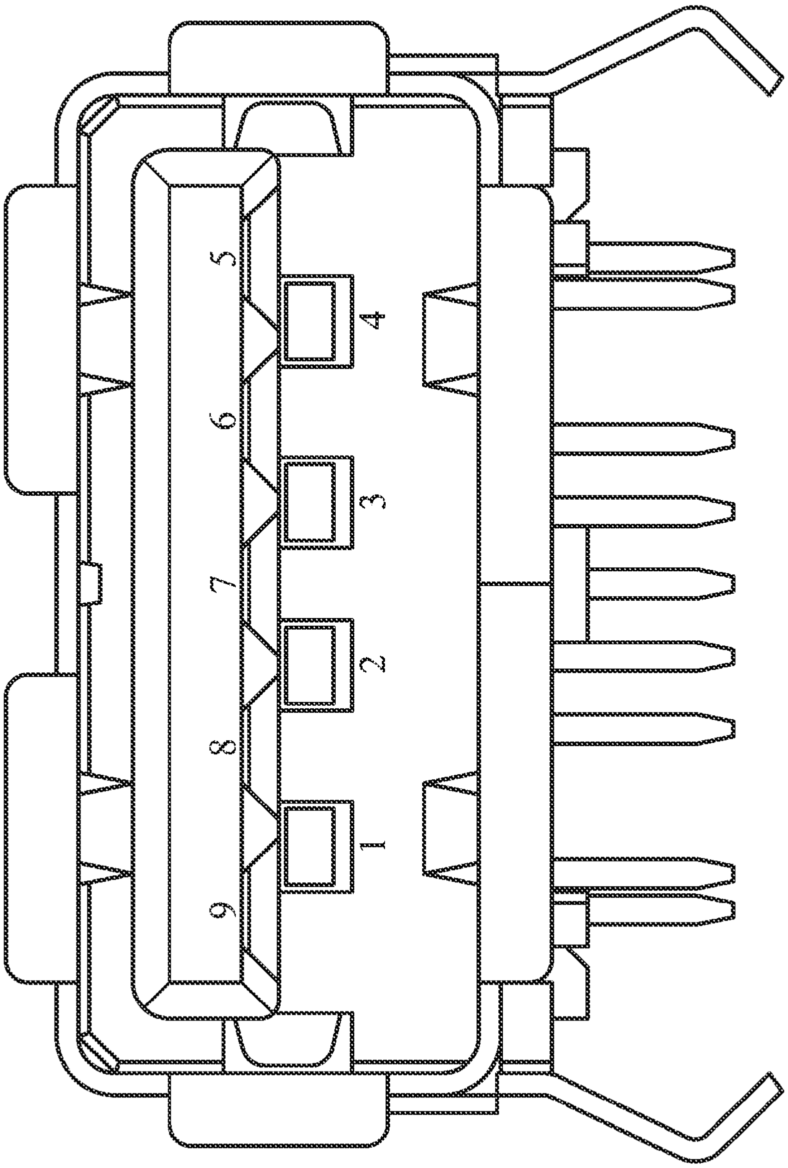
FIG. 1A (PRIOR ART)
FIG. 1A shows a Standard-A receptacle for USB 3.0.
Figure 1B:
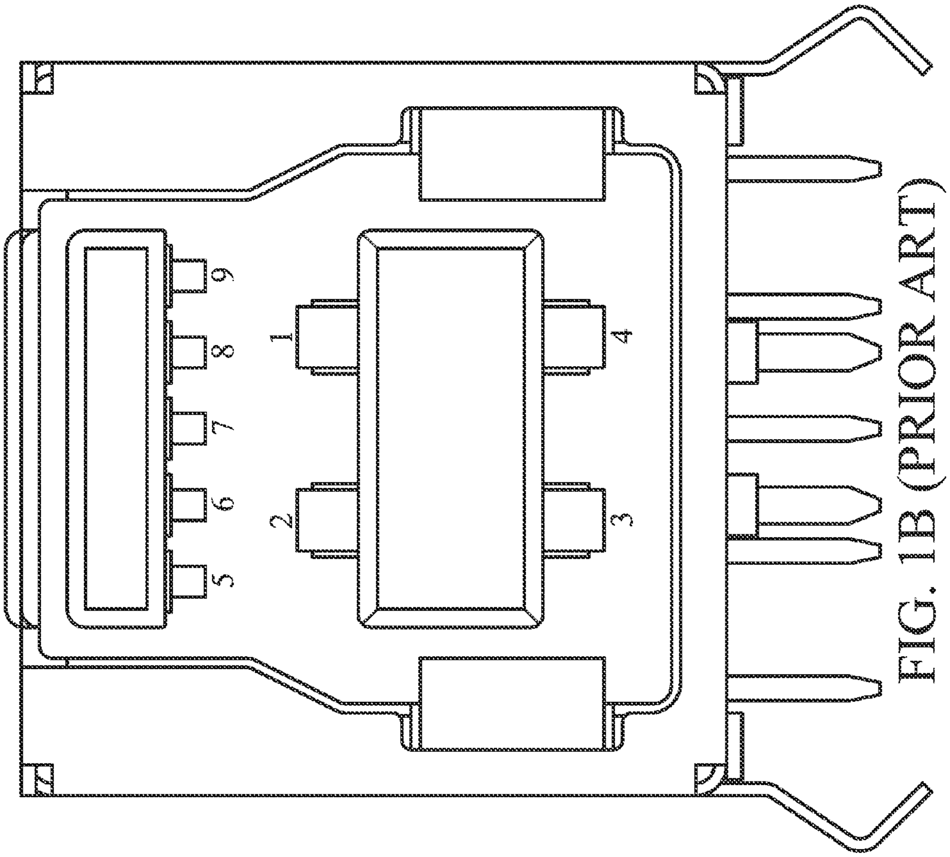
FIG. 1B (PRIOR ART)
FIG. 1B shows a Standard-B receptacle for USB 3.0.
Figure 1C:
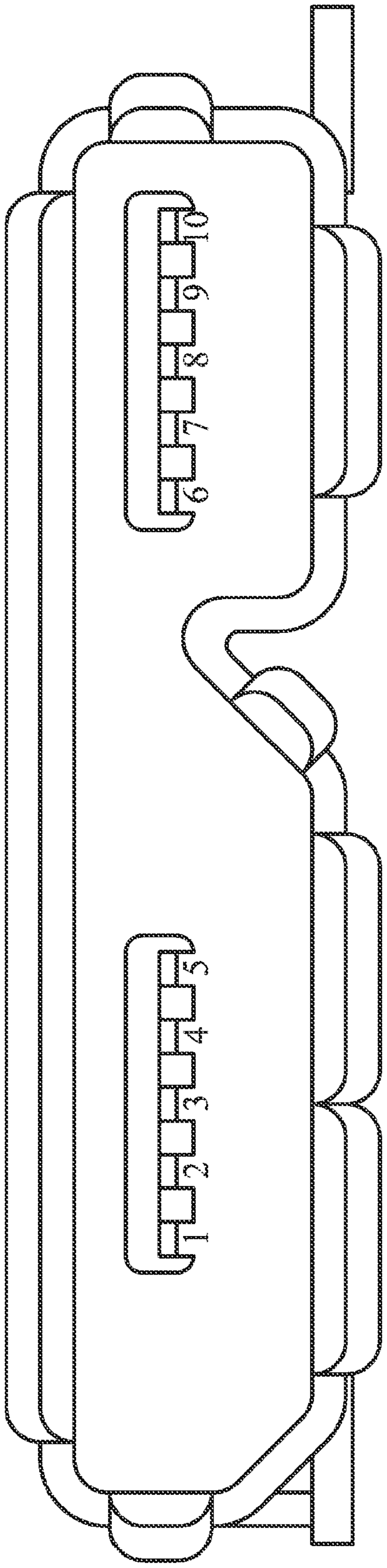
FIG. 1C (PRIOR ART)
FIG. 1C shows a Micro-B receptacle for USB 3.0.
Figure 1D:
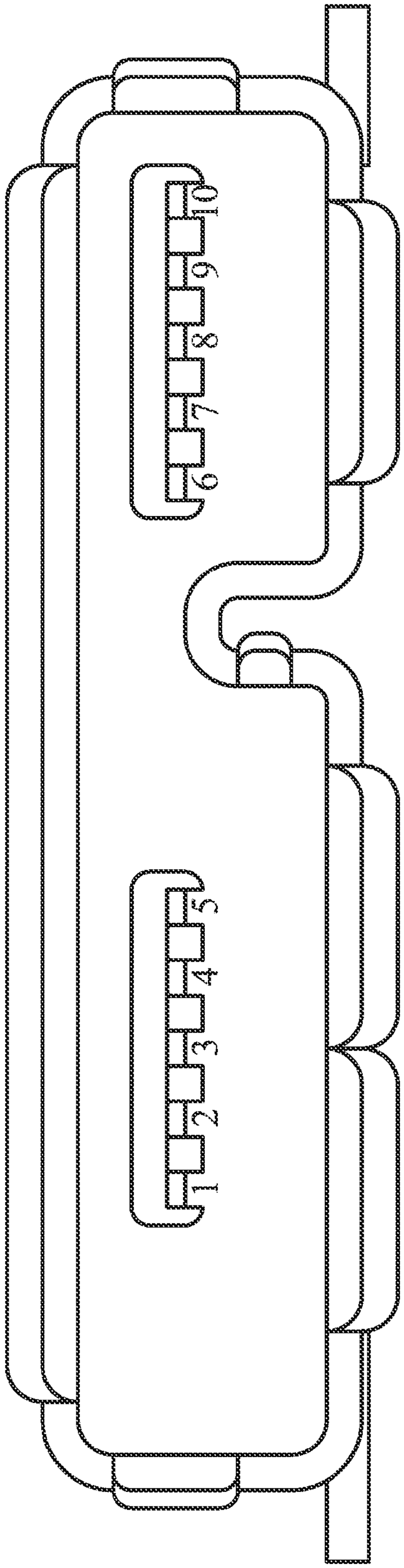
FIG. 1D (PRIOR ART)
FIG. 1D shows a Micro-AB receptacle for USB 3.0.

FIG. 1A to FIG. 1D show different types of receptacles for a Universal Serial Bus (USB) 3.0 standard. FIG. 1A and FIG. 1B show the Standard-A and Standard-B receptacles, respectively, which pin assignments are shown in FIG. 2A. FIG. 1C and FIG. 1D show the Micro-B and Micro-AB receptacles, respectively, which pin assignments are shown in FIG. 2B. USB 3.0 is a physical SuperSpeed bus combined in parallel with a physical USB 2.0 bus, thereby simultaneously providing data transfer for SuperSpeed and non-SuperSpeed (i.e. USB 2.0). Therefore, a USB 3.0 device comprises the signal wires of a pair of differential signals D+/D− for USB 2.0, two pairs of differential signals for SuperSpeed, a ground wire GND and a power wire VBUS, wherein the differential signals of SuperSpeed include a pair of transmitter differential signals SSTX+/SSTX− and a pair of receiver differential signals SSRX+/SSRX−, and the power wire VBUS is a wire for providing a power to the USB 3.0 device.

Figure 3A:
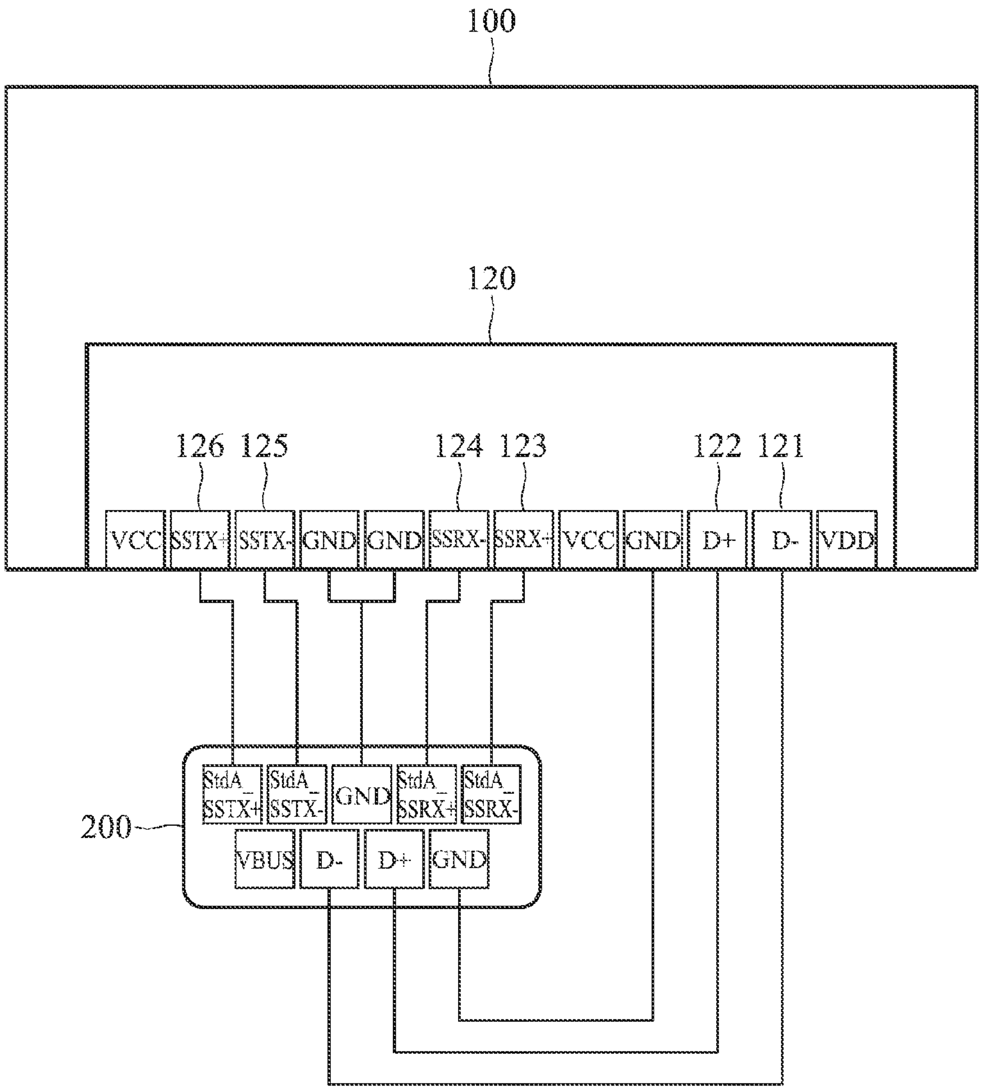
FIG. 3A shows a schematic illustrating interconnection between a Standard-A receptacle and an integrated circuit (IC) according to an embodiment of the invention.

FIG. 3A shows a schematic illustrating interconnection between a Standard-A receptacle 200 and an integrated circuit (IC) 100 according to an embodiment of the invention. In FIG. 3A, the IC 100 and the Standard-A receptacle 200 are disposed in a printed circuit board (PCB) of an electronic apparatus, wherein the IC 100 may access an external USB device (not shown) via the receptacle 200. As shown in FIG. 3A, the IC 100 comprises a controlling unit 120, wherein the controlling unit 120 is a circuit for a USB physical layer and has a plurality of pins coupled to the receptacle 200 for accessing the external USB device. The plurality of pins comprise a first group formed with the pins 121 and 122, a second group formed with the pins 123 and 124 and a third group formed with the pins 125 and 126, wherein the second group is disposed between the first and third groups. In the embodiment, the pins 121 and 122 are also defined as the D− and D+ pins for the IC 100, which are separately coupled to the D− and D+ pins of the receptacle 200 to receive and transmit the signals of the USB device corresponding to the USB 2.0 differential pair. Therefore, if a device that supports USB 2.0 standard is plugged in the receptacle 200, the controlling unit 120 may access the plugged device by receiving and transmitting the differential pair (i.e. D+ and D− signals) via the pins 121 and 122.

Furthermore, in one embodiment, the pins 123 and 124 are also defined as the SSRX+ and SSRX− pins for the IC 100, as shown in FIG. 3A. The pins 123 and 124 are separately coupled to the StdA_SSRX− and StdA_SSRX+ pins of the receptacle 200, which are used to receive the signals corresponding to USB 3.0 differential pair from the USB device. Therefore, if a device that supports SuperSpeed standard is plugged in the receptacle 200, the controlling unit 120 may receive the differential pair (i.e. SSRX− and SSRX+ signals of the IC 100) from the plugged device via the pins 123 and 124, so as to receive data from plugged device and perform the related operations in response to the received data. In one embodiment, the pins 125 and 126 are also defined as the SSTX− and SSTX+ pins for the IC 100, as shown in FIG. 3A. The pins 125 and 126 are separately coupled to the StdA_SSTX− and StdA_SSTX+ pins of the receptacle 200, which are used to transmit the signals corresponding to USB 3.0 differential pair to the USB device. Therefore, if the device that supports SuperSpeed standard is plugged in the receptacle 200, the controlling unit 120 may transmit the differential pair (i.e. SSTX− and SSTX+ signals of the IC 100) via the pins 125 and 126, so as to transmit data to the plugged device. Moreover, in the IC 100, the controlling unit further comprises the GND pins coupled to the ground signal wires of the receptacle 200, wherein the GND pin is disposed between the pins 122 and 123 or between the pins 124 and 125. In one embodiment, the ground signal wires of the receptacle 200 are provided directly from the ground terminal of the PCB. Furthermore, the controlling unit 120 further comprises the VCC and VDD pins which are power pins for providing various operating voltages to the controlling unit 120.

Figure 3B:
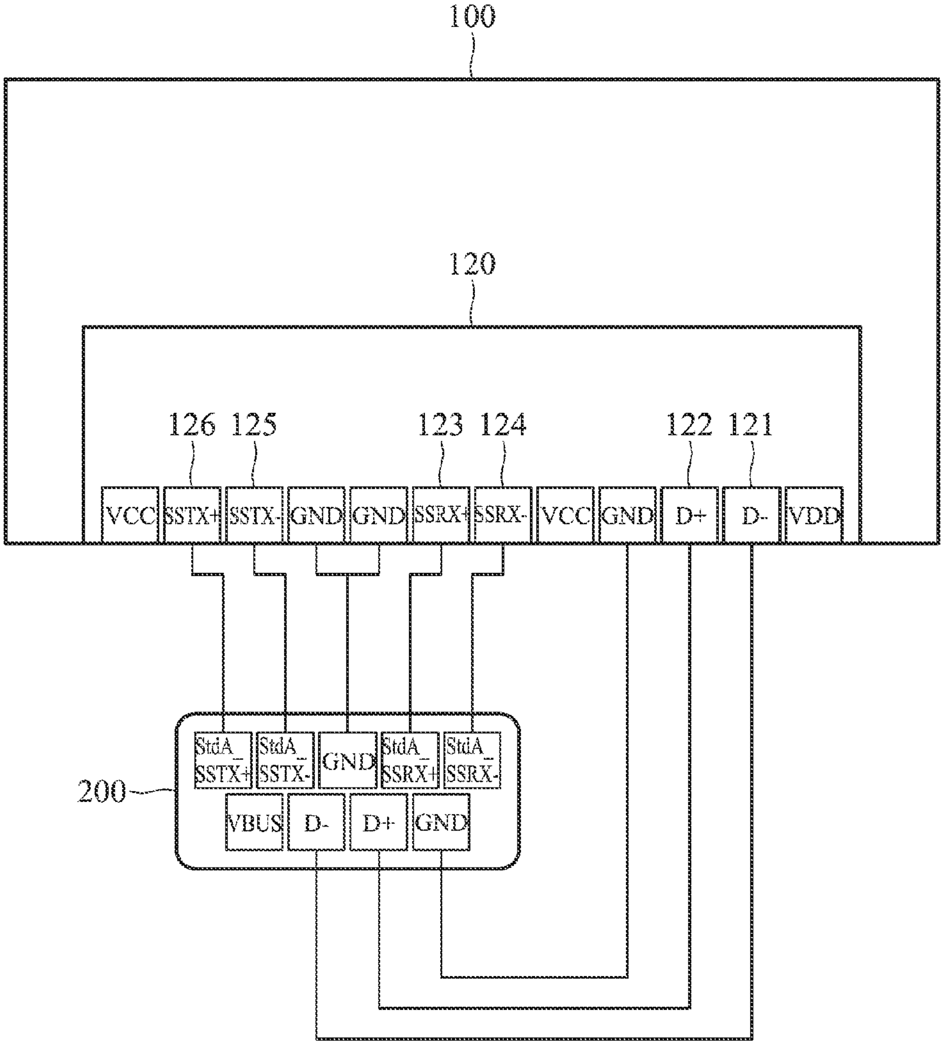
FIG. 3B to FIG. 3D show the schematics illustrating interconnection between a Standard-A receptacle and an IC according to other embodiments of the invention.
Figure 3C:
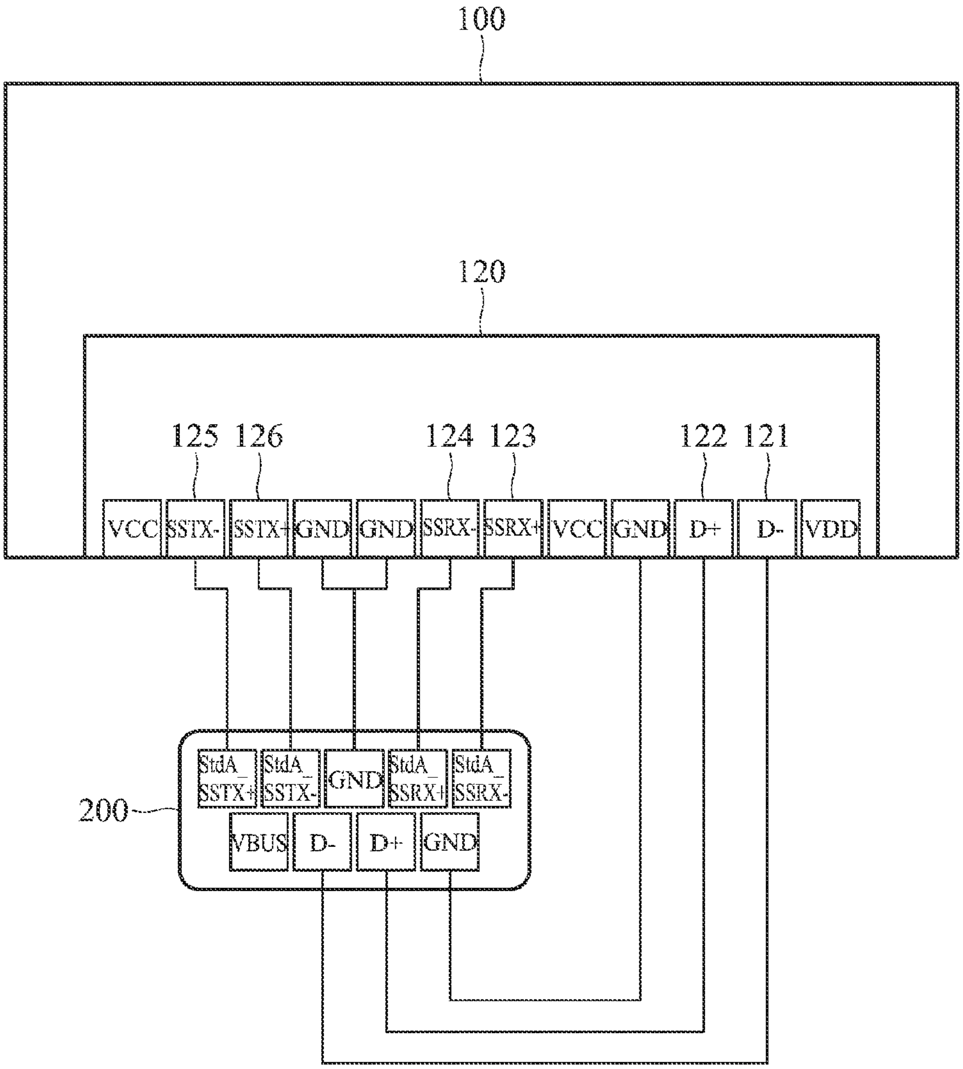
Figure 3D:
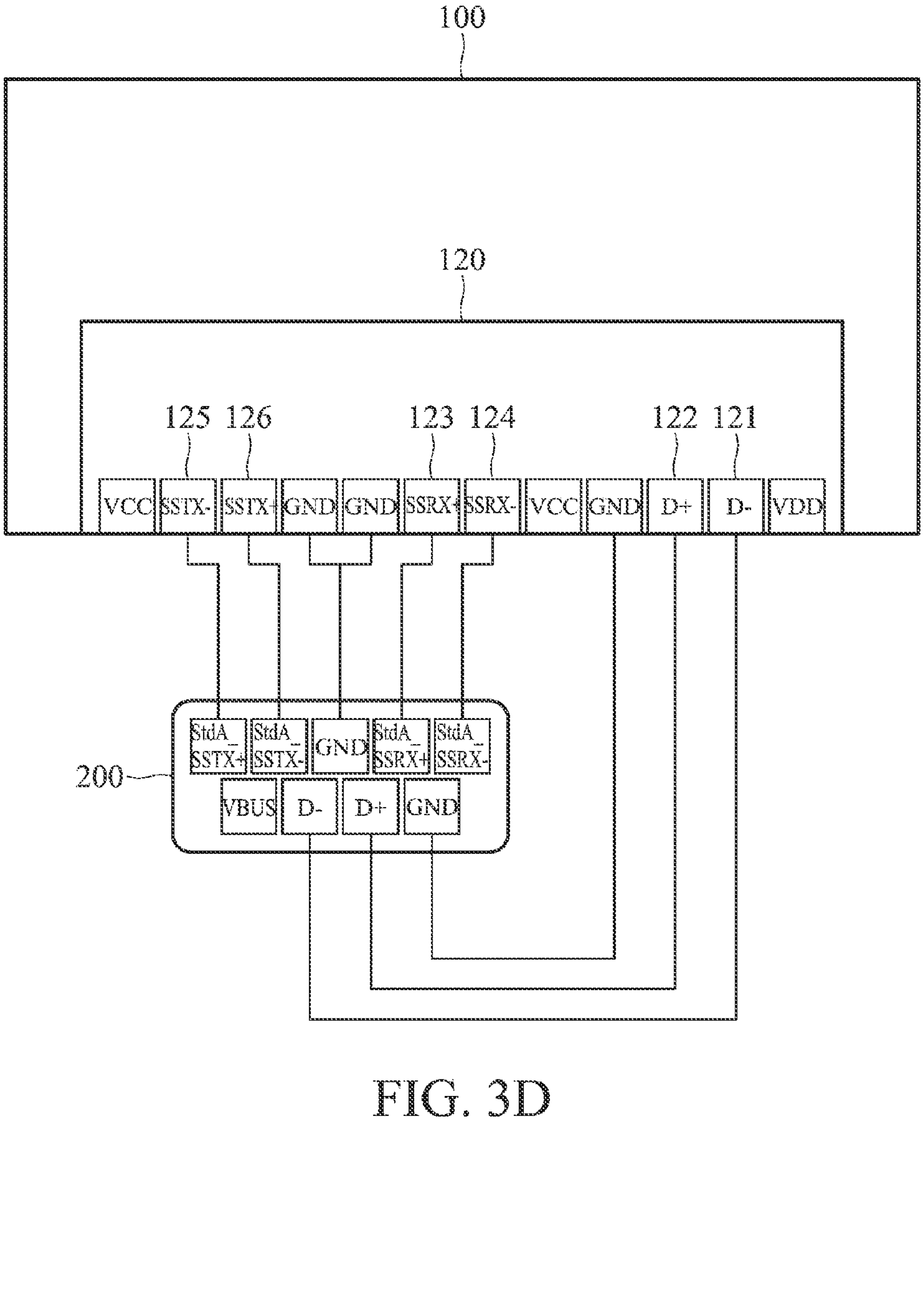

According to USB 3.0 applications, the pair of differential signals SSTX− and SSTX+ may be switched, and the pair of differential signals SSTX− and SSTX+ may also be switched. Therefore, in the IC 100, the disposed locations of the pins 123 and 124 may be switched, and the disposed locations of the pins 125 and 126 may be switched, as shown in FIG. 3B-FIG. 3D.

Figure 4:
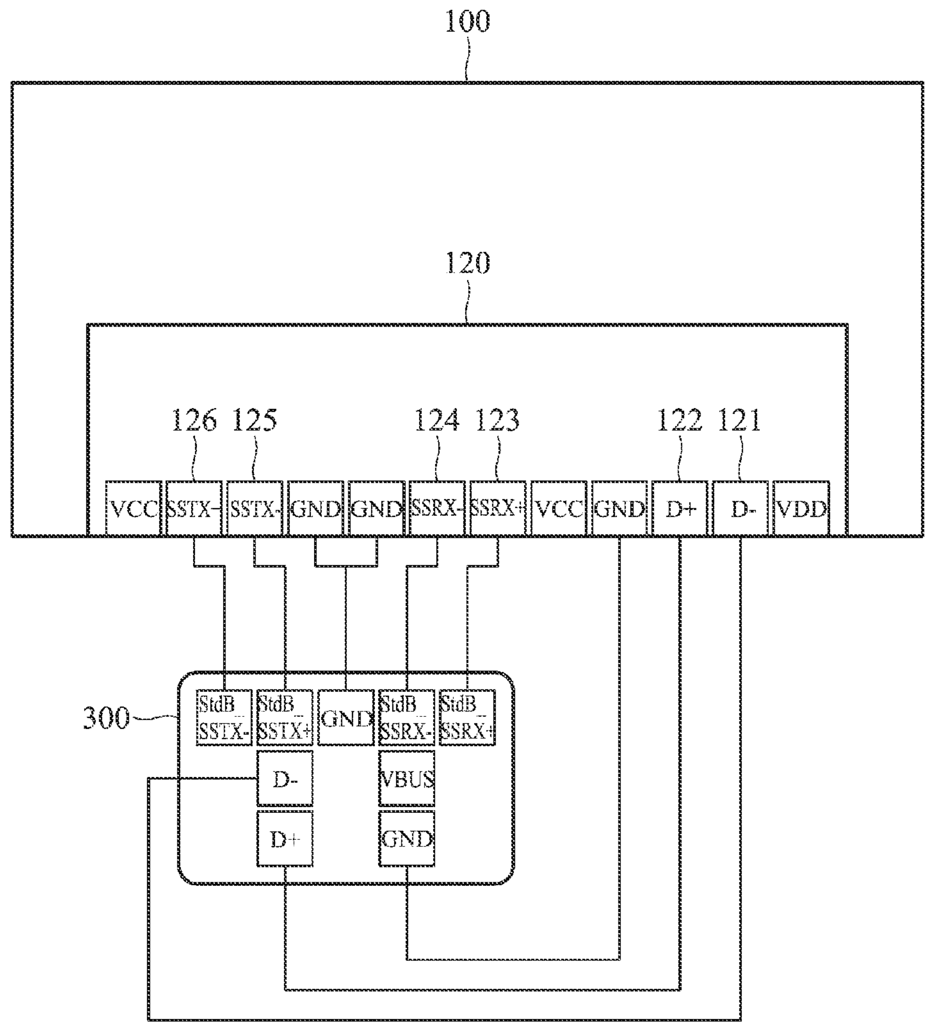
FIG. 4 shows a schematic illustrating interconnection between a Standard-B receptacle and an IC according to an embodiment of the invention.
Figure 5:
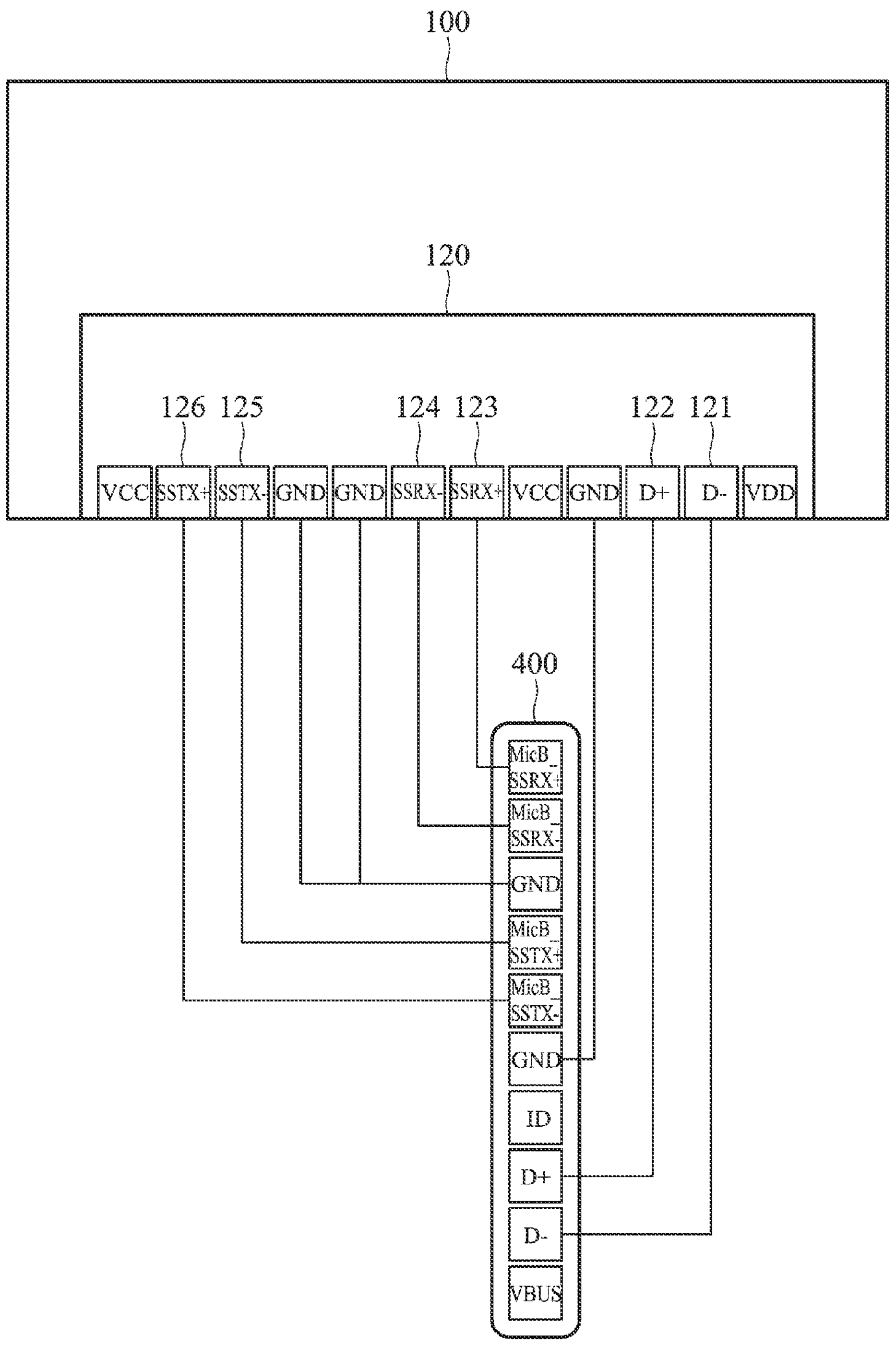
FIG. 5 shows a schematic illustrating interconnection between a Micro-B receptacle and an IC according to an embodiment of the invention.
Figure 6:
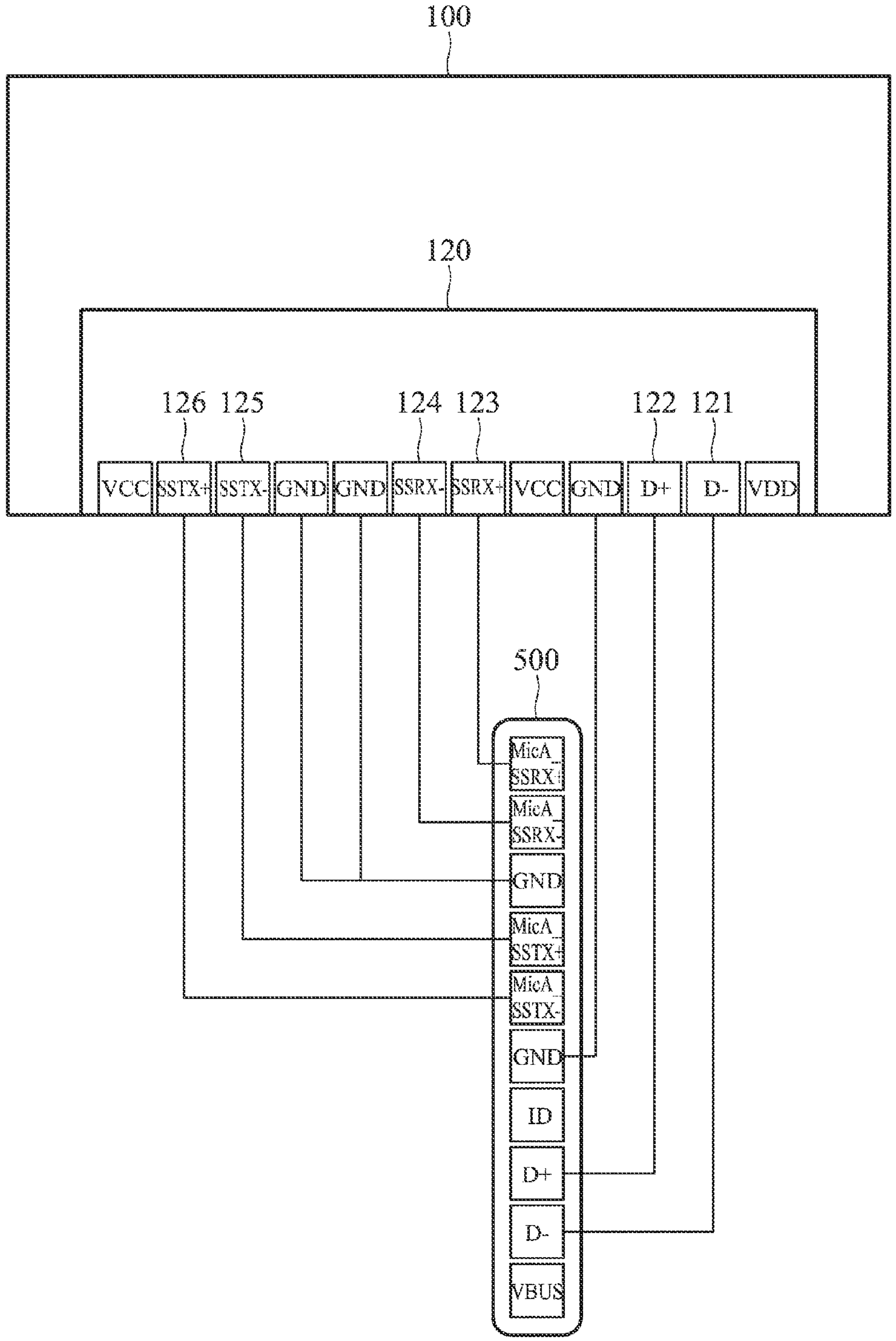
FIG. 6 shows a schematic illustrating interconnection between a Micro-AB receptacle and an IC according to an embodiment of the invention.

FIG. 4 shows a schematic illustrating interconnection between a Standard-B receptacle 300 and the IC 100 according to an embodiment of the invention. FIG. 5 shows a schematic illustrating interconnection between a Micro-B receptacle 400 and the IC 100 according to an embodiment of the invention. FIG. 6 shows a schematic illustrating interconnection between a Micro-AB receptacle 500 and the IC 100 according to an embodiment of the invention. Similarly, the IC 100 and the receptacle 300, 400 or 500 are disposed in a PCB of an electronic apparatus, wherein the IC 100 may access an external USB device (not shown) via the receptacle 300, 400 or 500. In the embodiment, by configuring the pins of the controlling unit 120, the pins 123 and 124 receiving a pair of differential signals are disposed in the center of a set of USB pins of the IC 100, so as to connect with various type of receptacles, thus avoiding lead crosstalk between the receptacle and the group of USB pins.

Figure 7:
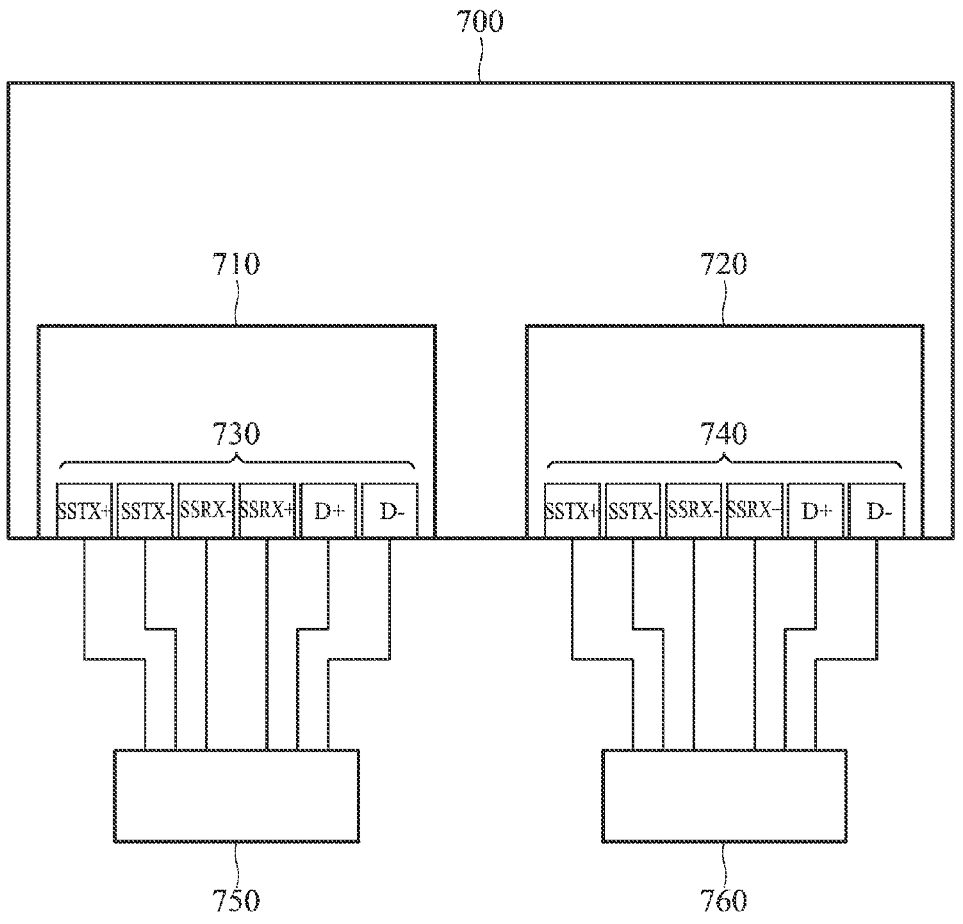
FIG. 7 shows a schematic illustrating interconnection between a plurality of receptacles and an IC according to an embodiment of the invention.

FIG. 7 shows a schematic illustrating interconnection between a plurality of receptacles and an IC 700 according to an embodiment of the invention. The IC 700 is disposed in a Quad Flat No-lead Package (QFN) or a Low profile Quad Flat Package (LQFP). In the embodiment, the IC 700 has a plurality of groups of USB pins, so as to access various USB devices. For example, a plurality of controlling units are disposed in the same side for an IC, wherein each controlling unit is a circuit for a USB physical layer. As shown in FIG. 7, a group of USB pins 730 of a controlling unit 710 is coupled to a receptacle 750 for accessing a first USB device, and a group of USB pins 740 of a controlling unit 720 is coupled to a receptacle 760 for accessing a second USB device, wherein the controlling units 710 and 720 are disposed in the same side of the IC 700. Therefore, the groups of USB pins provided by various controlling units are coupled to the corresponding receptacles, respectively, thus avoiding lead crosstalk between the different receptacles and the groups of USB pins for different controlling units. In one embodiment, the receptacles 750 and 760 are different types of USB 3.0 receptacles. For example, the receptacle 750 is a Standard-A receptacle and the receptacle 760 is a Standard-B receptacle.

Figure 8:
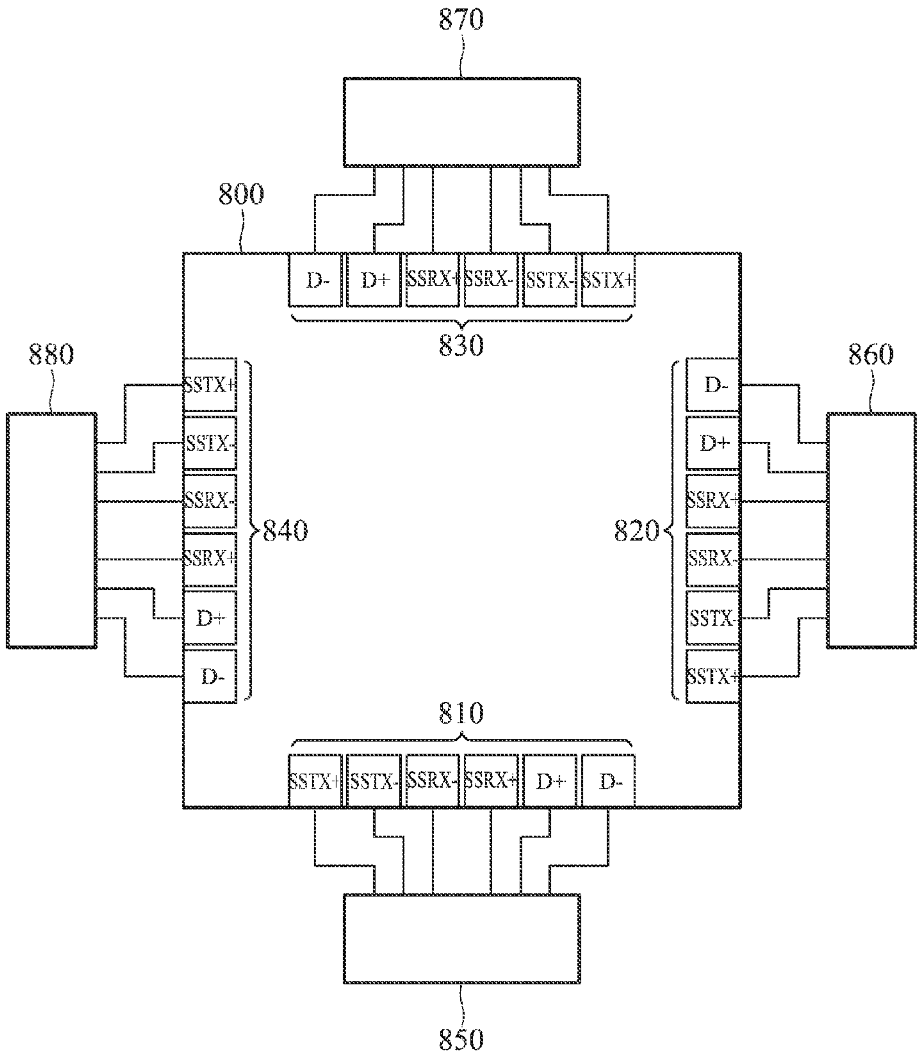
FIG. 8 shows a schematic illustrating interconnection between a plurality of receptacles and an IC according to another embodiment of the invention.

FIG. 8 shows a schematic illustrating interconnection between a plurality of receptacles and an IC 800 according to another embodiment of the invention. The IC 800 is disposed in a QFN Package or a LQFP Package. In the embodiment, the QFN or LQFP Package is used as an example, and does not to limit the invention. In one embodiment, a plurality of groups of USB pins are disposed in the IC 800 to access various USB devices. For example, a plurality of controlling units and the corresponding groups of USB pins are disposed in different sides for an IC. As shown in FIG. 8, a group of USB pins 810 of a first controlling unit is disposed in a first side of the IC 800 and is coupled to a receptacle 850 for accessing a first USB device. A group of USB pins 820 of a second controlling unit is disposed in a second side of the IC 800 and is coupled to a receptacle 860 for accessing a second USB device. A group of USB pins 830 of a third controlling unit is disposed in a third side of the IC 800 and is coupled to a receptacle 870 for accessing a third USB device. A group of USB pins 840 of a fourth controlling unit is disposed in a fourth side of the IC 800 and is coupled to a receptacle 880 for accessing a fourth USB device. Therefore, the different groups of USB pins are separately coupled to the corresponding receptacles, thus avoiding lead crosstalk between the different groups of USB pins. In one embodiment, the receptacles 850, 860, 870 and 880 are different types of USB 3.0 receptacles, which are determined according to practical applications. For example, the receptacles 850 and 860 are the Standard-A receptacles and the receptacles 870 and 880 are the Standard-B receptacles. Or, the receptacle 850 is a Standard-A receptacle, the receptacle 860 is a Standard-B receptacle, the receptacle 870 is a Micro-AB receptacle and the receptacle 880 is a Micro-B receptacle.

Furthermore, the IC described in the invention may be disposed in other packages, such as a Flip Chip package, a Ball Grid Array (BGA) package and so on. The different pins corresponding to the same group of USB pins are disposed in adjacent locations, thus avoiding lead crosstalk between the different receptacles and the groups of USB pins for different controlling units.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An integrated circuit for accessing a universal serial bus (USB) device via a USB 3.0 receptacle, comprising:
- a plurality of pins coupled to the USB 3.0 receptacle via a plurality of leads, comprising:
- a first group, coupling to a first pair of differential pins of the USB 3.0 receptacle, wherein the first pair of differential pins correspond to USB 2.0 signals of the USB device;
- a second group, coupling to a second pair of differential pins of the USB 3.0 receptacle, wherein the second pair of differential pins correspond to USB 3.0 signals of the USB device;
- a third group, coupling to a third pair of differential pins of the USB 3.0 receptacle, wherein the third pair of differential pins correspond to USB 3.0 signals of the USB device, and the second group is disposed between the first group and the third group;
- a ground pin, disposed between the second group and the third group;
- a first power pin, adjoined to the first group; and
- a second power pin, adjoined to the third group; and
- a controlling unit, controlling the plurality of pins to receive or transmit the USB 2.0 signals and the USB 3.0 signals.

2. The integrated circuit as claimed in claim 1, wherein the first power pin and the second power pin is arranged for providing various operating voltages to the controlling unit.

3. The integrated circuit as claimed in claim 1, further comprises another ground pin disposed between the first group and the second group.

4. The integrated circuit as claimed in claim 1, wherein the first group comprises: a first differential pin coupled to a D− pin of the USB 3.0 receptacle; and a second differential pin coupled to a D+ pin of the USB 3.0 receptacle.

5. The integrated circuit as claimed in claim 1, wherein the second group comprises: a third differential pin coupled to an SSRX− pin of the USB 3.0 receptacle; and a fourth differential pin coupled to an SSRX+ pin of the USB 3.0 receptacle.

6. The integrated circuit as claimed in claim 1, wherein the second group comprises: a third differential pin coupled to an SSTX− pin of the USB 3.0 receptacle; and a fourth differential pin coupled to an SSTX+ pin of the USB 3.0 receptacle.

7. An integrated circuit disposed in a specific package for accessing a plurality of universal serial bus (USB) devices via a plurality of USB 3.0 receptacles, comprising:
- a plurality of groups of pins, wherein each group of pins is disposed on different sides of the specific package and coupled to one of the USB 3.0 receptacles, and the pins of each group of pins are arranged in a single row along a side of the specific package where each group of pins is disposed on, and each group of pins comprises:
- a first sub-group, coupling to a first pair of differential pins of the one of the USB 3.0 receptacles corresponding to one of the USB devices;
- a second sub-group, coupling to a second pair of differential pins of the one of the USB 3.0 receptacles corresponding to the one of the USB devices;
- a third sub-group, coupling to a third pair of differential pins of the one of the USB 3.0 receptacles corresponding to the one of the USB devices, wherein the second sub-group is disposed between the first sub-group and the third sub-group;
- a ground pin, disposed between the second sub-group and the third sub-group;
- a first power pin, adjoined to the first sub-group; and
- a second power pin, adjoined to the third sub-group; and
- a plurality of controlling units, each controlling one of the groups of pins to receive or transmit signals on the first, second or third pair of differential pins,
- wherein the one of the USB 3.0 receptacles is a Standard-A receptacle, a Standard-B receptacle, a Micro-AB receptacle or a Micro-B receptacle.

8. The integrated circuit as claimed in claim 7, wherein the first power pin and the second power pin is arranged for providing various operating voltages to one of the controlling units.

* * * * *